United States Patent
Sumii et al.

Patent Number: 5,527,385
Date of Patent: Jun. 18, 1996

[54] THERMOCHROMIC COMPOSITION

[75] Inventors: Masaaki Sumii, Sakai; Fumiko Sakai, Ikoma; Yasuyuki Yoshimura, Ibaraki, all of Japan

[73] Assignee: Sakura Color Products Corporation, Osaka, Japan

[21] Appl. No.: 100,997

[22] Filed: Aug. 3, 1993

[30] Foreign Application Priority Data

Aug. 19, 1992 [JP] Japan .................................. 4-220184

[51] Int. Cl.⁶ ................................................ C09D 11/00
[52] U.S. Cl. .................... 106/21 A; 106/21 R; 106/21 D
[58] Field of Search ........................... 106/21 R, 21 A, 106/21 D; 503/205, 209

[56] References Cited

U.S. PATENT DOCUMENTS

| | | | |
|---|---|---|---|
| 3,560,229 | 2/1971 | Farnham et al. | 106/21 R |
| 4,022,624 | 5/1977 | Miyamoto et al. | 106/21 D |
| 4,425,161 | 1/1984 | Shibahashi et al. | 106/21 R |
| 4,865,648 | 9/1989 | Kito et al. | 106/21 A |
| 5,085,607 | 2/1992 | Shibahashi et al. | 106/21 R |
| 5,250,108 | 10/1993 | Tanaka et al. | 106/21 A |

FOREIGN PATENT DOCUMENTS

| | | |
|---|---|---|
| 155791 | 12/1981 | Japan . |
| 84284 | 4/1986 | Japan . |

*Primary Examiner*—Helene Klemanski
*Attorney, Agent, or Firm*—Larson and Taylor

[57] ABSTRACT

A thermochromic composition which comprises
(1) an electron-donating chromogenic organic compound,
(2) an electron-accepting compound,
(3) at least one desensitizer selected from among hydrazide compounds, and
(4) a thermochromic transition temperature modifier.

12 Claims, No Drawings

THERMOCHROMIC COMPOSITION

FIELD OF THE INVENTION

This invention relates to a thermochromic composition. More particularly, the invention relates to a thermochromic composition for providing printed matter, ink, paints, molded plastics, packaging materials, textiles, recording materials and the like with reversible thermochromism.

DESCRIPTION OF PRIOR ART

Thermochromic compositions in which the electron transfer reaction between an electron-donating chromogenic organic compound (electron donor) and an electron-accepting compound (electron acceptor) have been studied for a long time and are currently in wide use. It is also known that such thermochromic compositions once placed in a colored state can be faded or decolored if a specific solvent coexists. The solvent having such activity is called a desensitizer.

Thus, it is supposed that when said desensitizer coexists with the coloration-causing conjugate or association product from the electron donor and electron acceptor, said association product is dissolved in the desensitizer at temperatures above the melting point of the desensitizer whereby the electron donor and electron acceptor dissociate from each other and this results in fading. Therefore, the temperature at which color development and fading occur reversibly (thermochromic transition temperature) is in the vicinity of the melting point of the desensitizer.

Known as such desensitizer are, for example, azomethines, carboxylic acid primary amine salts, alcohols, amides, esters, and acid amide compounds (Japanese Kokai Tokkyo Koho No. 51-31682, Japanese Patent Publication No. 51-44706, Japanese Kokai Tokkyo Koho No. 60-58481 and Japanese Patent Publication No. 63-67839).

These prior art desensitizers have both advantages and disadvantages and are respectively limited in the field of application. In particular, the advent of a desensitizer capable of increasing the color difference between the density of the color developed and the background color development (density of the color in the faded state), for example a desensitizer capable of satisfactorily minimizing the background color development without adversely affecting the density of the developed color, has been earnestly awaited in various fields. However, none of the known desensitizers is known to fully meet such requirement.

The problem posed by the conventional desensitizers is that, since they are poor in desensitization potential (ability to cause fading), the increase in the proportions of the electron donor and electron acceptor for the purpose of increasing the developed color density is accompanied by an increase in background color development and, as a result, the color difference between the density of the color developed and the background color development cannot be increased so much.

Furthermore, while as mentioned above the desensitizer is to serve as a solvent for the electron donor and electron acceptor and for the association product from these, the known desensitizers are limited in the characteristic required of such solvent, namely the ability to dissolve the electron donor and electron acceptor, so that it is difficult to increase the proportions of the electron donor and electron acceptor. As a result, it is difficult to increase the density of the developed color.

OBJECTS OF THE INVENTION

It is an object of the invention to provide a reversibly thermochromic composition excellent in terms of developed color density, background color development, and color difference resulting from thermochromic transition. Another object of the invention is to provide an encapsulated thermochromic composition suited for effective utilization of said thermochromic composition.

SUMMARY OF THE INVENTION

The invention provides the following thermochromic compositions:

A thermochromic composition A which comprises (1) an electron-donating chromogenic organic compound (electron donor), (2) an electron-accepting compound (electron acceptor), and (3) at least one desensitizer selected from among hydrazide compounds;

A thermochromic composition B which comprises (1) an electron-donating chromogenic organic compound (electron donor), (2) an electron-accepting compound (electron acceptor), (3) at least one desensitizer selected from among hydrazide compounds, and (4) a thermochromic transition temperature modifier; and An encapsulated thermochromic composition which comprises the above-mentioned thermochromic composition A or B enclosed in microcapsule.

DETAILED DESCRIPTION OF THE INVENTION

The present inventors made intensive investigations to accomplish the objects mentioned above and as a result, found that hydrazide compounds have good characteristics rendering them suited for use as desensitizers for thermal color change in thermochromic compositions comprising an electron donor and an electron acceptor and that electron donors and electron acceptors are readily soluble in hydrazide compounds. The present invention has been completed based on the above findings.

In the practice of the invention, the electron donor may be any of those known in the art and the electron acceptor may also be any of those known in the art.

As examples of the electron donor which can be used in the practice of the invention, there may be mentioned, among others, the following:

Diarylphthalides such as crystal violet lactone, malachite green lactone, and 3-( 4-diethylaminophenyl)-3-(1-ethyl-2-methylindol-3-yl) phthalide, etc.;

Polyarylcarbinols such as Michler's hydrol, crystal violet carbinol, and malachite green carbinol, etc.;

Leucoauramines such as N-(2,3-dichlorophenyl) leucoauramine, N-benzoylauramine, N-acetylauramine, and N-phenylauramine, etc.;

Rhodamine B lactamssuch as Rhodamine B etc.;

Indolines such as 2-(phenyliminoethylidene) 3,3-dimethylindoline etc.;

Spiropyrans such as N-3,3-trimethylindolinobenzospiropyran and 8-methoxy-N- 3,3-trimethylindolinobenzospiropyran, etc.; and Fluorans such as 3-diethylamino-6-methyl-7-chlorofluoran, 3-diethylamino-7-methoxyfluoran, 3-diethylamino-6-benzyloxyfluoran, 3-amino-5-methylfluoran, 2-methyl-3-amino-6,7-dimethylfluoran, 2-bromo-6-cyclohexylaminofluoran, 2-(o-chlorophenylamino)-6- dibutylaminofluoran, 1,3-dimethyl-6-diethylaminofluoran, 3,6-diphenylaminofluoran, 9-(diethylamino)-spiro(12 H-benzoxanthene-12,1'(3'H)-isobenzofluoran)-3'-one, 2-(N-phenyl-N-methylamino)-6-(N-ethyl-N-phenylamino)fluoran, 3-diethylamino-6-methyl-7-chlorofluoran, and 3-diethylaminobenzo(a)-fluoran, etc.

As examples of the electron acceptor which can be used in the practice of the invention, there may be mentioned, among others, the following:

Phenols such as bisphenol A, p-phenylphenol, dodecylphenol, o-bromophenol, ethyl p-hydroxybenzoate, and methyl gallate, etc.;

Phenol resins;

Metal phenolates such as sodium phenolate, potassium phenolate, lithium phenolate, calcium phenolate, zinc phenolate, aluminum phenolate, magnesium phenolate, nickel phenolate, cobalt phenolate, tin phenolate, copper phenolate, iron phenolate, titanium phenolate, lead phenolate, and molybdenum phenolate, etc.;

Aromatic carboxylic acids such as phthalic acid and benzoic acid, etc.;

Aliphatic carboxylic acids containing 2 to 5 carbon atoms such as acetic acid and propionic acid, etc.;

Metal salts of carboxylic acids such as sodium oleate, zinc salicylate, and nickel benzoate, etc.;

Acid phosphoric esters;

Metal salts of acid phosphoric esters;

Triazole compounds such as 1,2,3-triazole and 1,2,3-benzotriazole, etc.;

Thiourea;

Thiourea derivatives such as diphenylthiourea and di-o-toluoylthiourea, etc.;

Halohydrins; and

Benzothiazoles.

Among these electron acceptors, phenols are particularly preferred in the practice of the invention.

The term "hydrazide compounds" as used herein includes, within the meaning thereof, compounds containing at least one —(CA)NHNR$^1$R$^2$ group. Such compounds can be produced by reacting a carboxylic acid ester or acid chloride with hydrazine or by reacting a phenylhydrazine with a carboxylic acid, for instance. As typical hydrazide compounds suited for use in the practice of the invention, there may be mentioned, for example, compounds of one of the following formulas:

$$R^1-\overset{\overset{O}{\|}}{C}-\underset{\underset{H}{|}}{N}-NR^2R^3 \quad [1]$$

wherein R$^1$ is a saturated alkyl group containing 1 to 26 carbon atoms, an unsaturated alkyl group containing 2 to 26 carbon atoms, a group of the formula

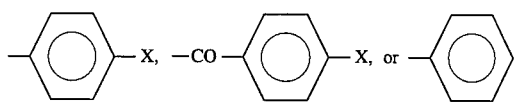

(in which X is H, OH, NO$_2$, NH$_2$ or NHNH$_2$) or H and R$^2$ and R$^3$ each independently is H, an alkyl group containing 1 to 26 carbon atoms or a phenyl group;

$$\overset{\overset{O}{\|}}{NH_2NHC}-R-\overset{\overset{O}{\|}}{CNHNH_2} \quad [2]$$

wherein R is an alkylene group containing 2 to 12 carbon atoms or a phenylene group;

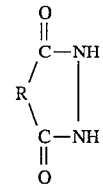

wherein R is a phenylene group, aminophenylene group or alkylene group;

$$HO-\overset{\overset{O}{\|}}{C}-R^1-\overset{\overset{O}{\|}}{C}-NHNR^2R^3 \quad [4]$$

wherein R$^1$ is a saturated alkylene group containing 2 to 12 carbon atoms or a phenylene group, and R$^2$ and R$^3$ each independently is H or an alkyl group or phenyl group;

$$R^1R^2NNH\overset{\overset{A}{\|}}{C}NHNR^1R^2 \quad [5]$$

wherein A is O or S, and R$^1$ and R$^2$ each independently is H or an alkyl group or phenyl group;

$$R^1-\overset{\overset{O}{\|}}{C}-NHNH-\overset{\overset{O}{\|}}{C}-R^2 \quad [6]$$

wherein R$^1$ and R$^2$ each independently is an alkyl group containing 1 to 26 carbon atoms; and

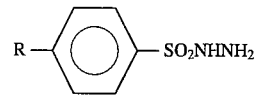

wherein R is H or CH$_3$.

As typical examples of the compound of formula [1], there may be mentioned acetohydrazide, butyrohydrazide, caprylohydrazide, caprohydrazide, laurohydrazide, myristohydrazide, palmitohydrazide, stearohydrazide, behenohydrazide, oleohydrazide, benzohydrazide, salicylohydrazide, p-nitrobenzohydrazide, 4-aminobenzohydrazide, isonicotinohydrazide, 4-hydroxybenzohydrazide, α-phenylstearohydrazide, and α,α-methylphenylstearohydrazide.

As typical examples of the compound of formula [2], there may be mentioned adipodihydrazide, sebacodihydrazide, and isophthalodihydrazide.

As typical examples of the compound of formula [3], there may be mentioned phthalohydrazide and 3-aminophthalohydrazide.

As a typical example of the compound of formula [4], there may be mentioned 2,2-dimethylsuccinohydrazide.

As typical examples of the compound of formula [5], there may be mentioned thiocarbohydrazide and diphenylcarbazide.

As a typical example of the compound of formula [6], there may be mentioned 1,2-diacetohydrazide.

As a typical example of the compound of formula [7], there may be mentioned p-toluenesulfonohydrazide.

The desensitizer to be used in the practice of the invention is not limited to any particular hydrazide species. Generally, however, hydrazide compounds having a molecular weight within the range of 84 to 900 and a melting point within the range of –50° C. to 300° C. are preferred as the desensitizer. Many of the compounds of formula [1] have a molecular weight and a melting point within the respective ranges mentioned above and they are particularly preferred.

The combination of the electron donor and electron acceptor with the hydrazide compound can suitably be selected taking into consideration the fact that the melting point of the hydrazide compound may be a crucial factor to the thermochromic transition temperature. On that occasion, the solubility of the electron donor, of the electron acceptor, and of the conjugate or association product formed from these should also recommendably taken into consideration.

In the practice of the invention, besides the hydrazide compound (first desensitizer), the other desensitizer (second desensitizer), for example at least one compound selected from among alcohols, esters, ketones, ethers, acid amides, fatty acids, aromatic hydrocarbons, thiols, sulfides, disulfides, sulfoxides, sulfones, azomethines, and fatty acid primary amine salts may be used as a thermochromic transition temperature modifier. It is generally difficult to adjust the thermochromic transition temperature of a thermochromic composition using a hydrazide compound alone. On the contrary, the combined use of such a second desensitizer (thermochromic transition temperature modifier) can increase the degree of freedom in adjusting the melting point of the desensitizer components (first desensitizer and second desensitizer) or, in other words, in adjusting the thermochromic transition temperature, so that thermochromic compositions varying in thermochromic transition (i.e. color change) temperature can be obtained. The second desensitizer should desirably be a compound which will not weaken the effects (high density of the color developed, and slight background color development) of the hydrazide compounds.

As examples of the second desensitizer which can be used in the practice of the invention, there may be mentioned the following compounds:

Alcohols such as n-cetyl alcohol, n-octyl alcohol, cyclohexanol, and hexylene glycol, etc.;

Esters such as ethyl myristate, stearyl laurate, and dioctyl phthalate, etc.;

Ketones such as methyl hexyl ketone, benzophenone, and stearone, etc.;

Ethers such as butyl ether, diphenyl ether, and distearyl ether, etc.;

Acid amides such as oleamide, stearamide, N-octyllauramide, and caproanilide, etc.;

Fatty acids containing not less than 6 carbon atoms such as lauric acid, stearic acid, and 2-hydroxymyristic acid, etc.;

Aromatic hydrocarbons such as isopropylbenzene, dodecylbenzene, biphenyl, trimethylbiphenyl, diphenylethane, dibenzyltoluene, propylnaphthalene, and butyltetralin, etc.;

Thiols such as n-decylmercaptan, n-myristylmercaptan, n-stearylmercaptan, isocetylmercaptan, and dodecylbenzylmercaptan, etc.;

Sulfides such as di-n-octyl sulfide, di-n-decyl sulfide, diphenyl sulfide, diethylphenyl sulfide, and dilauryl thiodipropionate, etc.;

Disulfides such as di-n-octyl disulfide, di-n-decyl disulfide, diphenyl disulfide, and dinaphthyl disulfide, etc.;

Sulfoxides such as diethyl sulfoxide, tetramethylene sulfoxide, and diphenyl sulfoxide, etc.;

Sulfones such as diethyl sulfone, dibutyl sulfone, diphenyl sulfone, and dibenzyl sulfone, etc.;

Azomethines such as benzylidenelaurylamine, p-methoxybenzylidenelaurylamine, and benzylidene-p-anisidine, etc.; and Fatty acid primary amine salts such as stearylamine oleate, myristylamine stearate, and stearylamine behenate, etc.

Among these second desensitizers, alcohols and esters are particularly preferred in the practice of the invention.

The proportions of the respective components can suitably be selected taking into consideration such factors as the specific intended use, the density required of the color developed, and background color development required. Generally, when the total amount of the desensitizer components [first desensitizer (hydrazide compound) plus second desensitizer (thermochromic transition temperature modifier)] is taken as 100 parts by weight, the electron donor is preferably used in a proportion of 0.1 to 20 parts by weight, more preferably 1 to 10 parts by weight, and the electron acceptor in a proportion of 0.1 to 40 parts by weight, more preferably 1 to 20 parts by weight. When the proportion of the electron donor and/or electron acceptor is excessive, there appears a tendency that the residual color in the faded state (background color development) becomes intensive. When, conversely, said proportion is too small, the color in the colored state (density of the color developed) tends to become less dense.

When a second desensitizer is used, the proportions of the first desensitizer (hydrazide compound) and the second desensitizer (thermochromic transition temperature modifier) can suitably be selected taking the required thermochromic transition temperature into consideration. Generally, it is advisable to select the first desensitizer/second desensitizer weight ratio within the range of 9.5:0.5 to 0.5:9.5, preferably 1:9 to 9:1. When the proportion of the second desensitizer is excessive, the effect (color difference upon color change) of the hydrazide compound tends to decrease while, when the proportion of the second desensitizer is too small, fine adjustment of the thermochromic transition temperature can hardly be made to a satisfactory extent.

When necessary, one or more of various additives may be incorporated into the thermochromic composition of the invention. Thus, for example, an ultraviolet absorbent, an antioxidant and/or a colorant may be added each in a proportion in which the effects of the invention will not be adversely affected.

Generally, when the thermochromic composition is used as such in ink compositions or plastic moldings, for instance, the following problems may often be encountered.

(1) The solid-liquid phase transition is repeated on the occasions of thermochromic transition, so that the components can readily migrate; this leads to a shortened service life during which reversible thermochromism can be maintained.

(2) In the case of ink, in particular, the vehicle components (resin, solvent, etc.) are apt to affect the thermochromic property and may adversely affect said property in some instances.

In such cases, it is recommended that the thermochromic composition be enclosed in microcapsule. The thermochromic composition is prevented, by microencapsulation thereof, from contacting with substances existing in the vicinity thereof on the occasion of use thereof, so that possible adverse effects of such substances occurring in the vicinity can be avoided.

For microencapsulating the thermochromic composition, those capsulation techniques known in the art can be applied. As typical capsulation techniques, there may be mentioned, among others, the interfacial polymerization, in-situ polymerization, coacervation, in-liquid drying, and spray drying techniques. Various thermoplastic or thermosetting resins can be used as the microcapsule forming materials.

EFFECTS OF THE INVENTION

The thermochromic composition of the invention is excellent from the viewpoints of developed color density, background color development, and color difference and, therefore, can provide good reversible thermochromism in various applications. The encapsulated thermochromic composition of the invention hardly undergoes adverse effects, on the thermochromism thereof, of substances occurring in the vicinity in various applications.

DETAILED DESCRIPTION OF PREFERRED EMBODIMENTS

EXAMPLES 1–7 AND COMPARATIVE EXAMPLES 1–5

Thermochromic compositions

Thermochromic compositions were prepared according to the formulations shown in Table 1. For each composition, the thermochromic transition (color change) temperature and the chromaticity (Lab) in the colored state and in the faded state were measured and the density of the color developed (EH), the background color development (ES), and the color difference upon color change ($\Delta E$) were calculated. The colors before and after color change were also ascertained. The results obtained are shown in Table 1.

The results shown in Table 1 indicate that the thermochromic compositions of the invention each gives a color difference upon color change ($\Delta E$) of not less than 50, which means a sharp color change. In Comparative Example 4 where stearamide, which is described in Japanese Kokai Tokkyo Koho No. 51-31682 and currently in wide use and has a structure similar to that of the hydrazide compounds, was used as the desensitizer, the color difference $\Delta E$ is as low as 34. In view of this, the unexpectedness of the effects of the present invention can be understood.

The thermochromic transition temperature and the chromaticity in each state were measured in the following manner.

(1) A piece of filter paper cut to 15 mm×15 mm was impregnated with 30 μl of each thermochromic composition in a molten state. Each paper thus impregnated was used as a test specimen. The specimen was placed on a heating plate fitted with a temperature sensor and the temperature was gradually raised (5° C./minute). The temperature at which the color change was almost complete as confirmed by the eye was read. The value thus read was regarded as the thermochromic transition (color change) temperature.

(2) The chromaticity of the specimen was measured at the time when the color change was almost complete in the above procedure (chromaticity in faded state). Then, the heating plate was cooled to room temperature (20° C.) and the chromaticity of the specimen (chromaticity in colored state) was measured in the same manner.

The density of the color developed (EH) was calculated using the formula 1 shown below, the background color development (ES) using the formula 2 shown below, and the color difference upon color change ($\Delta E$) using the formula 3 shown below.

$$EH = \sqrt{(LH-LB)^2 + (aH-aB)^2 + (bH-bB)^2} \quad \text{(Formula 1)}$$

$$ES = \sqrt{(LS-LB)^2 + (aS-aB)^2 + (bS-bB)^2} \quad \text{(Formula 2)}$$

$$\Delta E = \sqrt{(LH-LS)^2 + (aH-aS)^2 + (bH-bS)^2} \quad \text{(Formula 3)}$$

In the above formula 1, formula 2, and formula 3, L is a symbol designating the psychometric lightness and, a and b are symbols each indicating a chromaticness index. LH, aH, and bH indicate the chromaticity of the specimen in the colored state (chromaticity in colored state). LS, aS, and bS indicate the chromaticity of the specimen in the faded state (chromaticity in faded state). LB, aB, and bB indicate the chromaticity of a standard white board. EH is the density of the developed color as calculated, ES is the background color development, and $\Delta E$ is the color difference upon color change. The greater the value of EH is, the higher the density of the color developed is. The smaller the value of ES is, the better the result of color fading is. The greater the value of $\Delta E$ is, the better (sharper) the color change between the colored state and the faded state is.

EXAMPLES 8–20

Thermochromic compositions

Thermochromic compositions were prepared according to the formulations shown in Table 2 and the thermochromic transition temperatures were measured and the color changes upon thermochromic transition observed in the same manner as in Examples 1–7. The results thus obtained are shown in Table 2.

EXAMPLE 21

Microencapsulated thermochromic composition and application thereof

An epoxy resin (Epikote 828; Shell Oil Co.; 5 g) was dissolved in 80 g of the thermochromic composition of Example 3 with heating at 80° C., the solution was added dropwise to 160 g of a 5% aqueous solution of gelatin with stirring, and the mixture was stirred to turn the former solution into minute droplets (aqueous suspension).

Separately, 3 g of a curing agent (Epicure U, epoxy resin-amine adduct; Shell Oil Co.) was dissolved in 6 g of water, and the solution was added gradually to the above-mentioned aqueous suspension with continued stirring. While the liquid temperature was maintained at 80° C., stirring was continued for about 4 hours to give a dispersion of microcapsule comprising the epoxy resin and the thermochromic composition enclosed in said epoxy resin. The microcapsule were recovered by centrifugation and dried. The dried capsules had an average grain size of 10 μm.

Then, 20 parts by weight of the thus-obtained encapsulated thermochromic composition, 65 parts by weight of an epoxy resin (Epikote 828; Shell Oil Co.), 10 parts by weight of Cardura E and 5 parts by weight of a fluorescent pigment (Fluorescent Pink 820-1/2; Sterling Drug Inc.) were uniformly mixed up using a homogenizer to give a thermochromic epoxy resin type screen ink.

Some pieces of earthenware and glass cups were printed with the thus-obtained ink supplemented with a polyamideamine (curing agent) just prior to printing. The ink was dried at ordinary temperature or with heating to give a cured ink film. This film reversibly changed color at 45° C. from black (lower temperature side) to pink (higher temperature side) with a very sharp contrast between the colored state (lower temperature side) and the faded state (higher temperature side).

EXAMPLE 22

Microcapsulated thermochromic composition and application thereof

The thermochromic composition of Example 5 (90 g) was melted by heating at 80° C. and added dropwise to 100 g of a 5% aqueous solution of an ethylene-maleic anhydride copolymer (EMA-31; Monsanto Co.) with stirring, and the mixture was further stirred to turn said composition into minute droplets. The resultant aqueous suspension was adjusted to pH 4.5 with a 20% aqueous solution of sodium hydroxide.

Separately, 4 g of melamine was dissolved in 10 g of a 37% aqueous solution of formaldehyde at 70° C., and this solution was added gradually to the above aqueous suspension with continued stirring. While the liquid temperature was maintained at 70° C., stirring was continued for 2 hours to give a dispersion of microcapsule comprising the thermochromic composition enclosed in a melamine resin. The microcapsule were recovered by centrifugation. After drying, they had an average grain size of 5 µm.

Then, 15 parts by weight of the thus-obtained encapsulated thermochromic composition, 40 parts by weight of an acrylic emulsion (NK Binder AS-50; Shin-Nakamura Chemical Co., Ltd.), 40 parts by weight of water, 3 parts by weight of a fluorescent pigment (Luminous Yellow NF; Dainippon Ink and Chemicals, Inc.) and 2 parts by weight of a thickener (Rheogic 306H; Nihon Junyaku Co., Ltd.) were uniformly mixed up using a homogenizer to give a thermochromic printing paste.

A knit cotton fabric was printed with the thus-obtained printing paste using a 100-mesh silk screen printing plate and dried at 100° C. for 5 minutes to give a thermochromic fabric capable of reversibly changing color at 37° C. from black (lower temperature side) to yellow (higher temperature side).

EXAMPLE 23

Microencapsulated thermochromic composition and application thereof

The thermochromic composition of Example 7 (90 g) was melted by heating at 80° C. and added dropwise to 100 g of a 5% aqueous solution of sodium polystyrenesulfonate (molecular weight about 50,000) with stirring, and the mixture was further stirred to turn the melt into minute droplets. The resultant aqueous suspension was adjusted to pH 3.0 with acetic acid.

Separately, 6 g of urea and 1 g of resorcinol were dissolved in 15 g of a 37% aqueous solution of formaldehyde, and this solution was added gradually to the above aqueous suspension with continued stirring. While the liquid temperature was maintained at 70° C., stirring was continued for 2 hours to give a dispersion of microcapsule comprising the thermochromic composition enclosed in a urea resin. The microcapsule were recovered by centrifugation. After drying, they had an average grain size of 3 µm.

Then, 15 parts by weight of the thus-obtained encapsulated thermochromic composition, 84 parts by weight of an oligoester acrylate (Aronix M-8060; Toagosei Chemical Industry Co., Ltd.), and 1 part by weight of benzoin isobutyl ether were uniformly mixed up using a homogenizer to give an ultraviolet-curable silk screen ink capable of reversibly changing color at 65° C. from black (lower temperature side) to colorless (higher temperature side).

EXAMPLE 24

Microencapsulated thermochromic composition and application thereof

The thermochromic composition of Example 9 (80 g) and a polyfunctional isocyanate (Sumidur N-75; Sumitomo Chemical Co., Ltd., 3 g) were comelted by heating at 80° C., the melt was added dropwise to 160 g of a 5% aqueous solution of polyvinyl alcohol with stirring, and the resulting mixture was further stirred to disperse the melt into minute droplets (aqueous suspension). To this aqueous suspension was gradually added 6 g of Epicure U and stirring was continued for about 5 hours while the liquid temperature was maintained at 65° C. A dispersion of microcapsule comprising the thermochromic composition enclosed in a polyurea resin was thus obtained. The microcapsule were recovered by centrifugation. After drying, they had an average grain size of 18 µm.

Then, 15 parts by weight of the thus-obtained encapsulated thermochromic composition, 84 parts by weight of an oligoester acrylate (Aronix M-8060; Toagosei Chemical Industry Co., Ltd.) and 1 part by weight of benzoin isobutyl ether were uniformly mixed up using a homogenizer to give an ultraviolet-curable silk screen ink capable of reversibly changing color at 48° C. from blue (lower temperature side) to colorless (higher temperature side).

EXAMPLE 25

Microencapsulated thermochromic composition

A 100-g portion of a 5% aqueous solution of gelatin was heated to 50° C. and 50 g of the thermochromic composition of Example 14 melted by heating at 80° C. was added dropwise to the gelatin solution with stirring, and the mixture was further stirred to turn the melt into minute droplets. Further, 100 g of a 5% aqueous solution of gum arabic was added, and the pH was lowered to 4.5 by adding 1% hydrochloric acid with stirring. Then, 200 g of water was added to cause coacervation. Then, this liquid was cooled to 10° C., 1 g of a 37% aqueous solution of formaldehyde was added, the pH was adjusted to 9 with a 20% aqueous solution of sodium hydroxide, and stirring was continued at ordinary temperature for 4 hours to give a dispersion of microcapsule comprising the thermochromic composition enclosed in gelatin. The microcapsule were recovered by centrifugation. After drying, they had an average grain size of 20 µm.

EXAMPLE 26 AND COMPARATIVE EXAMPLE 6

Application of thermochromic compositions

The thermochromic composition of Example 5 (3 parts by weight) was added to 100 parts by weight of polyethylene and the mixture was kneaded up at 180°–200° C. to give a thermochromic polyethylene composition (Example 26). This composition very clearly changed color from black to colorless (fading) upon heating to temperatures above 37° C. and resumed the black color (color development) upon cooling to temperatures below 37° C.

For comparison, a thermochromic polyethylene composition (Comparative Example 6) was prepared using parts by weight of the thermochromic composition of Comparative Example 3 in lieu of 3 parts by weight of the thermochromic composition of Example 5. When compared with Example 26, said polyethylene composition was lower in the density of the color developed and showed a remarkable residual black color in the faded state.

EXAMPLE 27

Application of thermochromic composition

The thermochromic composition of Example 1 (5 parts by weight), 10 parts by weight of microcrystalline wax and 5 parts by weight of polyethylene of low molecular weight (molecular weight 1,500) were melted together by heating at 100° C.–110° C. for 15 minutes and the melt was molded in a crayon form to give thermochromic crayons. These crayons sharply and reversibly changed color at 85° C. from black (lower temperature side) to colorless (higher temperature side).

EXAMPLE 28

Application of thermochromic composition

The thermochromic composition of Example 14 (20 parts by weight) and 30 parts by weight of a rosin-modified maleic acid resin were dissolved in 50 parts by weight of xylene by uniformly stirring at 40° C. to give a thermochromic paint. This paint was colorless at ordinary temperature but, upon cooling to –15° C., assumed a bright red color.

EXAMPLE 29

Application of thermochromic composition

The thermochromic composition of Example 10 (20 parts by weight) and 5 parts by weight of a hydrogenated hydrocarbon resin (Escoresso 5000; Esso Chemical Co.) were dissolved in 60 parts by weight of toluene and 15 parts by weight of methyl isobutyl ketone by sufficient stirring to give a thermochromic gravure ink. A film derived from this gravure ink sharply and reversibly changed color at 143° C. from yellow (lower temperature side) to colorless (higher temperature side).

TABLE 1

| | Components (composition) | | | | Results | | | | | |
|---|---|---|---|---|---|---|---|---|---|---|
| | Electron donor | Electron acceptor | First de-sensitizer | Second de-sensitizer | Thermochromic transition | Change of color | | | | |
| | (parts by weight) | (parts by weight) | (parts by weight) | (parts by weight) | temperature (°C.) | Lower temp. | Higher temp. | EH | ES | ΔE |
| Example 1 | TH107 6.0 | Bisphenol A 12.0 | Stearo hydrazide 100.0 | | 85 | Black | Colorless | 68 | 12 | 57 |
| Example 2 | TH107 4.0 | Bisphenol A 8.0 | Stearo hydrazide 100.0 | | 85 | Black | Colorless | 55 | 8 | 48 |
| Comparative Example 1 | TH107 6.0 | Bisphenol A 12.0 | | Cetyl alcohol 100.0 | 40 | Black | Colorless | 59 | 26 | 33 |
| Comparative Example 2 | TH107 4.0 | Bisphenol A 8.0 | | Cetyl alcohol 100.0 | 40 | Black | Colorless | 54 | 16 | 39 |
| Comparative Example 3 | TH107 6.0 | Bisphenol A 12.0 | | Lauryl palmitate 100.0 | 30 | Black | Colorless | 56 | 25 | 32 |
| Comparative Example 4 | TH107 6.0 | Bisphenol A 12.0 | | Stearamide 100.0 | 90 | Black | Colorless | 60 | 25 | 34 |
| Comparative Example 5 | TH107 6.0 | Bisphenol A 12.0 | | Stearic acid 100.0 | 68 | Black | Colorless | 64 | 49 | 19 |
| Example 3 | TH107 6.0 | Bisphenol A 12.0 | Stearo hydrazide 50.0 | Cetyl alcohol 50.0 | 45 | Black | Colorless | 67 | 13 | 55 |
| Example 4 | TH107 4.0 | Bisphenol A 8.0 | Stearo hydrazide 50.0 | Cetyl alcohol 50.0 | 45 | Black | Colorless | 54 | 10 | 45 |
| Example 5 | TH107 6.0 | Bisphenol A 12.0 | Stearo hydrazide 30.0 | Lauryl palmitate 70.0 | 37 | Black | Colorless | 68 | 11 | 57 |
| Example 6 | TH107 6.0 | Bisphenol A 12.0 | Stearo hydrazide 40.0 | Stearamide 60.0 | 71 | Black | Colorless | 69 | 12 | 57 |
| Example 7 | TH107 6.0 | Bisphenol A 12.0 | Stearo hydrazide 65.0 | Stearic acid 35.0 | 64 | Black | Colorless | 71 | 15 | 55 |

Note: In Table 1, "TH107" means 2-(o-chlorophenylamino)-6-dibutylaminofluoran (manufactured by Hodogaya Chemical Co., Ltd.).

TABLE 2

| | Components (composition) | | | | Results | | |
|---|---|---|---|---|---|---|---|
| | Electron donor (parts by weight) | Electron acceptor (parts by weight) | First desensitizer (parts by weight) | Second desensitizer (parts by weight) | Thermochromic transition temperature (°C.) | Change of color Lower temp. | Change of color Higher temp. |
| Example 8 | PSD-P 3.0 | Zinc salicylate 4.5 | Caprylohydrazide 100.0 | | 72 | Pink | Colorless |
| Example 9 | BLUE-502 6.0 | Ethyl p-hydroxy benzoate 12.0 | α,α-Methylphenyl-laurohydrazide 100.0 | | 48 | Blue | Colorless |
| Example 10 | NCO-1 4.0 | Potassium bisphenol A 14.0 | Adipodihydrazide 100.0 | | 143 | Yellow | Colorless |
| Example 11 | ATP 6.5 | 1,2,3-Triazole 13.0 | Sebacodihydrazide 100.0 | | 200 | Green | Colorless |
| Example 12 | PSD-V 4.5 | p-Phenyl-phenol 10.0 | Isonicotino hydrazide 100.0 | | 162 | Vermilion | Colorless |
| Example 13 | PSD-P 6.0 | Diphenyl-thiourea 15.0 | Caprodihydrazide + thiocarbohydrazide 50.0 + 50.0 | | 62 | Pink | Colorless |
| Example 14 | Crystal violet lactone 3.0 | Bisphenol S 6.0 | Myristohydrazide 70.0 | Decyl alcohol 30.0 | -15 | Blue | Colorless |
| Example 15 | NCB-5 6.0 | Phenol resin 12.0 | 2,2-di-methyl-succinohydrazide + 1,2-diaceto-hydrazide 20.0 + 20.0 | Methyl myristate 60.0 | 20 | Blue | Colorless |
| Example 16 | Rhodamine B lactam 7.0 | Methyl gallate 14.0 | p-Toluenesuflono-hydrazide 25.0 | Phenyl sulfide 75.0 | 75 | Red | Colorless |
| Example 17 | Malachite green carbinol 6.5 | Phthalic acid 15.0 | Phthalo-dihydrazide 15.0 | Capric acid 85.0 | 30 | Green | Colorless |
| Example 18 | PSD-V 5.0 | Phenyl p-hydroxy-benzoate 10.0 | 4-Hydroxybenzo-hydrazide 20.0 | Phenyl benzoate 80.0 | 51 | Vermilion | Colorless |
| Example 19 | NCO-1 4.5 | Bisphenol Z 13.5 | Benzohydrazide 45.0 | Dodecylbenzene 55.0 | -25 | Yellow | Colorless |
| Example 20 | BLUE-502 6.5 | o-Bromophenol 15.0 | Acetohydrazide 70.0 | Stearylamine laurate 30.0 | 63 | Blue | Colorless |

Notes: In Table 2, "PSD-P" stands for 3-diethylaminobenzo(a)-fluoran (manufactured by Shin-Nisso Kako Co., Ltd.; "BLEU-502" for 3-(4-diethylaminophenyl)-3-(1-ethyl-2-methylindol-3-yl)phthalide (manufactured by Yamamoto Kagaku Gosei Co., Ltd.); "NCO-1" for 1,3-dimethyl-6-diethylaminofluoran (manufactured by Hodogaya Chemical Co., Ltd.); "ATP" for 2-(N-phenyl-N-methylamino)-6-(N-ethyl-N-phenylamino)fluoran (manufactured by Yamada Chemical Co., Ltd.); "PSD-V" for 3-diethylamino-6-methyl-7-chlorofluoran (manufactured by Shin-Nisso Kako Co., Ltd.); and "NCB-5" for 3,6-diphenylaminofluoran (manufactured by Hodogaya Chemical Co., Ltd.).

What is claimed is:

1. A thermochromic composition with reversible thermochromism which comprises:

(1) an electron-donating chromogenic organic compound,
   (2) an electron-accepting compound,
   (3) at least one desensitizer selected from among hydrazide compounds, and
   (4) a thermochromic transition temperature modifier, wherein the electron-accepting compound is used in 1 to 20 parts by weight when the total amount of the desensitizer plus thermochromic transition temperature modifier is taken as 100 parts by weight.

2. A thermochromic composition as claimed in claim 1, wherein said desensitizer is a hydrazide compound having a molecular weight within the range of 84 to 900.

3. A thermochromic composition as claimed in claim 1, wherein said desensitizer is a hydrazide compound having a melting point within the range of -50° C. to 300° C.

4. A thermochromic composition as claimed in claim 1, wherein said desensitizer comprises at least one hydrazide compound selected from the group consisting of compounds of the formula

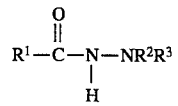

wherein $R^1$ is a saturated alkyl group containing 1 to 26 carbon atoms, an unsaturated alkyl group containing 2 to 26 carbon atoms, a group of the formula

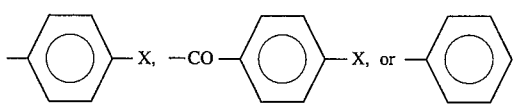

(in which X is H, OH, NO$_2$, NH$_2$ or NHNH$_2$) or H, and R$^2$ and R$^3$ each independently is H, an alkyl group containing 1 to 26 carbon atoms or a phenyl group, compounds of the formula

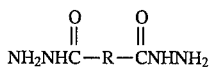

wherein R is an alkylene group containing 2 to 12 carbon atoms or a phenylene group, compounds of the formula

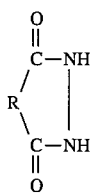

wherein R is a phenylene group, aminophenylene group or alkylene group, compounds of the formula

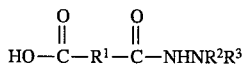

wherein R$^1$ is a saturated alkylene group containing 2 to 12 carbon atoms or a phenylene group, and R$^2$ and R$^3$ each independently is H or an alkyl group or phenyl group, compounds of the formula

wherein A is O or S, and R$^1$ and R$^2$ each independently is H or an alkyl group or phenyl group, compounds of the formula

wherein R$^1$ and R$^2$ each independently is an alkyl group containing 1 to 26 carbon atoms, and compounds of the formula

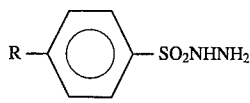

wherein R is H or CH$_3$.

5. A thermochromic composition as claimed in claim 1, wherein said desensitizer comprises at least one hydrazide compound selected from the group consisting of acetohydrazide, butyrohydrazide, caprylohydrazide, caprohydrazide, laurohydrazide, myristohydrazide, palmitohydrazide, stearohydrazide, behenohydrazide, oleohydrazide, benzohydrazide, salicylohydrazide, p-nitrobenzohydrazide, 4-aminobenzohydrazide, isonicotinohydrazide, 4-hydroxybenzohydrazide, α-phenylstearohydrazide, α,α-methylphenylstearohydrazide, adipodihydrazide, sebacodihydrazide, isophthalodihydrazide, phthalohydrazide, 3-aminophthalohydrazide, 2,2-dimethylsuccinohydrazide, thiocarbohydrazide, diphenylcarbazide, 1,2-diacetohydrazide and p-toluenesulfonohydrazide.

6. A thermochromic composition as claimed in claim 1, wherein said thermochromic transition temperature modifier comprises at least one compound selected from the group consisting of alcohols, esters, ketones, ethers, acid amides, fatty acids, aromatic hydrocarbons, thiols, sulfides, disulfides, sulfoxides, sulfones, azomethines, and fatty acid primary amine salts.

7. A thermochromic composition as claimed in claim 1, wherein said thermochromic transition temperature modifier comprises at least one compound selected from the group consisting of n-cetyl alcohol, n-octyl alcohol, cyclohexanol, hexylene glycol, ethyl myristate, stearyl laurate, dioctyl phthalate, methyl hexyl ketone, benzophenone, stearone, butyl ether, diphenyl ether, distearyl ether, oleamide, stearamide, N-octyllauramide, caproanilide, lauric acid, stearic acid, 2-hydroxymyristic acid, isopropylbenzene, dodecylbenzene, biphenyl, trimethylbiphenyl, diphenylethane, dibenzyltoluene, propylnaphthalene, butyltetralin, n-decylmercaptan, n-myristylmercaptan, n-stearylmercaptan, isocetylmercaptan, dodecylbenzylmercaptan, di-n-octyl sulfide, di-n-decyl sulfide, diphenyl sulfide, diethylphenyl sulfide, dilauryl thiodipropionate, di-n-octyl disulfide, di-n-decyl disulfide, diphenyl disulfide, dinaphthyl disulfide, diethyl sulfoxide, tetramethylene sulfoxide, diphenyl sulfoxide, diethyl sulfone, dibutyl sulfone, diphenyl sulfone, dibenzyl sulfone, benzylidenelaurylamine, p-methoxybenzylidenelaurylamine, benzylidene-p-anisidine, stearylamine oleate, myristylamine stearate, and stearylamine behenate.

8. A thermochromic composition as claimed in claim 1, wherein said electron-donating chromogenic organic compound comprises at least one compound selected from the group consisting of diarylphthalides, polyarylcarbinols, leucoauramines, rhodamine B lactams, indolines, spiropyrans, and fluorans.

9. A thermochromic composition as claimed in claim 1, wherein said electron-donating chromogenic organic compound comprises at least one compound selected from the group consisting of crystal violet lactone, malachite green lactone, 3-(4-diethylaminophenyl)-3-( 1-ethyl-2-methylindol-3-yl)phthalide, Michler's hydrol, crystal violet carbinol, malachite green carbinol, N-(2,3-dichlorophenyl)leucoauramine, N-benzoylauramine, N-acetylauramine, N-phenylauramine, rhodamine B lactam, 2-(phenyliminoethylidene)-3,3-dimethylindoline, N-3,3-trimethylindolinobenzospiropyran, 8-methoxy-N-3,3-trimethylindolinobenzospiropyran, 3-diethylamino-6-methyl- 7-chlorofluoran, 3-diethylamino-7-methoxyfluoran, 3-diethylamino-6-benzyloxyfluoran, 3-amino-5-methylfluoran, 2-methyl-3-amino-6,7-dimethylfluoran, 2-bromo-6-cyclohexylaminofluoran, 2-(o-chlorophenylamino)-6-dibutylaminofluoran, 1,3-dimethyl-6-diethylaminofluoran, 3,6-diphenylaminofluoran, 9-(diethylamino)-spiro(12H-benzoxanthene-12,1'(3'H)-isobenzofluoran)-3'-one, 2-(N-phenyl-N-methylamino)-6-(N-ethyl-N-phenylamino)fluoran, 3-diethylamino-6-methyl-7-chlorofluoran, and 3-diethylaminobenzo(a)-fluoran.

10. A thermochromic composition as claimed in claim 1, wherein said electron-accepting compound comprises at least one compound selected from the group consisting of phenols, phenol resins, metal phenolates, aromatic carboxylic acids, aliphatic carboxylic acids containing 2 to 5 carbon atoms, metal salts of carboxylic acids, acid phosphoric esters, metal salts of acid phosphoric esters, triazole compounds, thiourea derivatives, halohydrins, and benzothiazoles.

11. A thermochromic composition as claimed in claim 1, wherein said electron-accepting compound comprises at least one compound selected from the group consisting of bisphenol A, p-phenylphenol, dodecylphenol, o-bromophenol, ethyl p-hydroxybenzoate, methyl gallate, phenol resins, sodium phenolate, potassium phenolate, lithium phenolate, calcium phenolate, zinc phenolate, aluminum phenolate, magnesium phenolate, nickel phenolate, cobalt phenolate, tin phenolate, copper phenolate, iron phenolate, titanium phenolate, lead phenolate, molybdenum phenolate, phthalic acid, benzoic acid, acetic acid, propionic acid, sodium oleate, zinc salicylate, nickel benzoate, 1,2,3-triazole, 1,2,3-benzotriazole, thiourea, diphenylthiourea, and di-o-toluoylthiourea.

12. A microencapsulated thermochromic composition which comprises the thermochromic composition of claim 1 enclosed within a microcapsule.

* * * * *